United States Patent
Supnik et al.

(10) Patent No.: US 7,401,355 B2
(45) Date of Patent: Jul. 15, 2008

(54) FIREWALL LOAD BALANCING USING A SINGLE PHYSICAL DEVICE

(75) Inventors: Robert M. Supnik, Carlisle, MA (US); David S. Caplan, Acton, MA (US); Paul G. Phillips, Westboro, MA (US); Michael Banatt, Cambridge, MA (US)

(73) Assignee: Sun Microsystems, Santa Clara, CA (US)

( * ) Notice: Subject to any disclaimer, the term of this patent is extended or adjusted under 35 U.S.C. 154(b) by 825 days.

(21) Appl. No.: 10/835,794

(22) Filed: Apr. 30, 2004

(65) Prior Publication Data

US 2005/0257256 A1 Nov. 17, 2005

(51) Int. Cl.
*H04L 29/00* (2006.01)
(52) U.S. Cl. .................................................. 726/11
(58) Field of Classification Search .................. 726/11
See application file for complete search history.

(56) References Cited

U.S. PATENT DOCUMENTS

| 6,880,089 | B1 * | 4/2005 | Bommareddy et al. | 726/11 |
| 7,171,681 | B1 * | 1/2007 | Duncan et al. | 726/11 |
| 2002/0141401 | A1 | 10/2002 | Albert et al. | |
| 2002/0194497 | A1 * | 12/2002 | McGuire | 713/201 |
| 2003/0131262 | A1 * | 7/2003 | Goddard | 713/201 |

FOREIGN PATENT DOCUMENTS

WO WO-03/034237 A1 4/2003

OTHER PUBLICATIONS

Hamann, Roland, "Mehr Leistung mit Firewall Loading Balancing," *ntz*, vol. 54(1/2):80-81 (2001).
Cheng, Lebin, et al,. "Constructing high-performance firewall load-balancing clusters: practical experience and novel ideas," *Proc. SPIE*, vol. 4527:134-141 (2001).
Verwoerd, Theuns, et al., "GLOB: Genetic LOad Balancing," Ninth IEEE International Conference, pp. 70-75 (2001).
Hamann, Roland, "Mehr Leistung mit Firewall Load Balancing," *NTZ (Nachrichtentechnische Zeitschrift)*, vol. 54(1/2):80-81 (2001).
Written Opinion for Application No. PCT/US2005/014013, dated Mar. 29, 2006.

* cited by examiner

*Primary Examiner*—Matthew B Smithers
(74) *Attorney, Agent, or Firm*—Chapin IP Law LLC; Barry W. Chapin, Esq.

(57) ABSTRACT

Methods and systems for load balancing a plurality of entities, such as firewalls, in a network environment are disclosed. In particular, the load balancing of firewalls on a bidirectional traffic path is performed using a single device that controls both incoming and outgoing traffic through the firewalls. The single device may include virtual routers for controlling the bidirectional traffic through the firewalls. A first virtual router may control incoming traffic to the firewalls and the other virtual router may control outgoing traffic to the firewalls. The virtual routers are logical partitions of the device layered on the physical resources of the device. The virtual routers share all or portions of the physical resources of the single device.

24 Claims, 7 Drawing Sheets

FIREWALL LOAD BALANCING USING A SINGLE PHYSICAL DEVICE

FIELD OF THE INVENTION

The present invention relates generally to network environments and more particularly to methods and systems for load balancing firewalls in network environments.

BACKGROUND OF THE INVENTION

When corporations connect their internal computer networks with the Internet, there is a risk that the corporate networks may be accessed by unauthorized parties via the Internet. Due to the Internet's openness, parties on the Internet may easily get into the corporate networks and obtain internal data of the corporations absent some protective measures being in place. Thus, corporations often employ a firewall to protect their networks from unauthorized access from the Internet.

A firewall is a system that limits network access between two or more networks. A firewall typically resides in between the Internet and corporate networks and filters all traffic to and from the corporate networks. The firewall may allow anyone on the corporate networks to access the Internet, but stop unauthorized parties from gaining access to the corporate networks. Multiple firewalls may be employed in parallel to be able to handle an increasing amount of traffic to and from the corporate networks. When multiple firewalls are employed, the firewalls need to be load balanced for the efficient processing of the traffic. Typically, a first physical device is employed to load balance on the side of the firewalls that is interfaced with the Internet or other untrusted network and a second physical device is employed to load balance on the side of the firewalls that interface with trusted network.

SUMMARY OF THE INVENTION

The present invention provides methods and systems for load balancing a plurality of entities, such as firewalls, in a network environment. In particular, the present invention provides methods and systems for load balancing network entities on a bidirectional traffic path using a single device that controls both incoming and outgoing traffic through the entities. The single device may include virtual switches and/or virtual routers for controlling the bidirectional traffic through the entities. A first virtual switch/router may control incoming traffic to the entities and the other virtual switch/router may control outgoing traffic to the entities. The virtual routers operate independently of each other so that data routed by a virtual router is routed independently from the data routed by the other router, using separate routing tables, protocols and IP interfaces.

In one aspect of the present invention, an apparatus is provided for load balancing traffic in a network environment. The apparatus includes a first virtual router for routing the traffic to and from an untrusted network. The apparatus also includes a second virtual router for routing the traffic to and from a trusted network.

In another aspect of the present invention, an electronic device is provided for load balancing a plurality of firewalls in a network environment. The electronic device has switching capabilities for directing traffic to the plurality of firewalls. The electronic device includes a first virtual router for load balancing the plurality of firewalls for traffic from an untrusted network to the plurality of firewalls. The electronic device also includes a second virtual router for load balancing the plurality of firewalls for traffic from a trusted network to the plurality of firewalls.

In still another aspect of the present invention, a method is provided for load balancing a plurality of entities on a bidirectional traffic path between a first node and a second node in networks. In the method, a single physical device is provided for routing traffic from the first node to the plurality of entities and routing traffic from the second node to the plurality of entities. The plurality of entities are load balanced in both directions using the single physical device.

In yet still another aspect of the present invention, a medium is provided that holds instructions executable in an electronic device for load balancing a plurality of entities in a network environment. A device is provided between a front end and the plurality of entities and between a back end and the plurality of entities. The device is provided with a first virtual router for routing the traffic from the front end to the plurality of entities. The device is provided with a second virtual router for routing the traffic from the back end to the plurality of entities.

By providing a single device for balancing bidirectional loads of entities in a network environment, the present invention enables users to efficiently configure and manage the bidirectional load balancing of the network entities. Additionally, the single device enables the users to reduce cost for the bidirectional load balancing of the network entities.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention provides for load balancing of traffic destined to and from firewalls via a single physical device, such as a switch. In other embodiments, the device may be a server or other components that can appropriately direct traffic. The physical switch of the illustrative embodiment supports virtual switching mechanisms that facilitate the load balancing. One virtualized switching mechanism is used for load balancing on the dirty zone that interfaces with the Internet or other untrusted network, and one virtualized switching mechanism is used for load balancing the clean zone which interfaces with the trusted network. The use of a single device is less complex and less expensive than the use of conventional systems.

Although the illustrative embodiment will be described for only illustrative purposes relative to firewalls, one of skill in the art will appreciate that the present invention may apply to other types of entities that require load balancing on a bidirectional traffic path in the network environment.

In the illustrative embodiment of the present invention, the firewalls are load balanced using a single device that controls both incoming traffic to the firewalls and outgoing traffic to the firewalls. The single device includes virtual routers for controlling the bidirectional traffic of the firewalls. The virtual routers may reside in a single virtual switch or in separate virtual switches. The distinction between virtual routers and virtual switches will be explained below. A first virtual router may control incoming traffic to the firewalls and another virtual router may control outgoing traffic to the firewalls. The virtual routers operate independently of each other so that data routed by a virtual router is routed independently from the data routed by the other router, using separate routing tables, protocols, and IP interfaces.

In the illustrative embodiment of the present invention, a physical switch is partitioned into multiple logical domains, designated as virtual switches. Thus each virtual switch may be used exclusively by a given party (e.g., customer). A virtual switch may include one or more virtual routers that determine the route and specifically what adjacent point the data should be sent to. The virtual routers first determine all possible paths to the destination and then pick the most expedient route, based on the traffic load and the number of hops. Routers work at the network layer (layer 3 of the layered Open Systems Interconnection (OSI) communication model).

Figure 1:
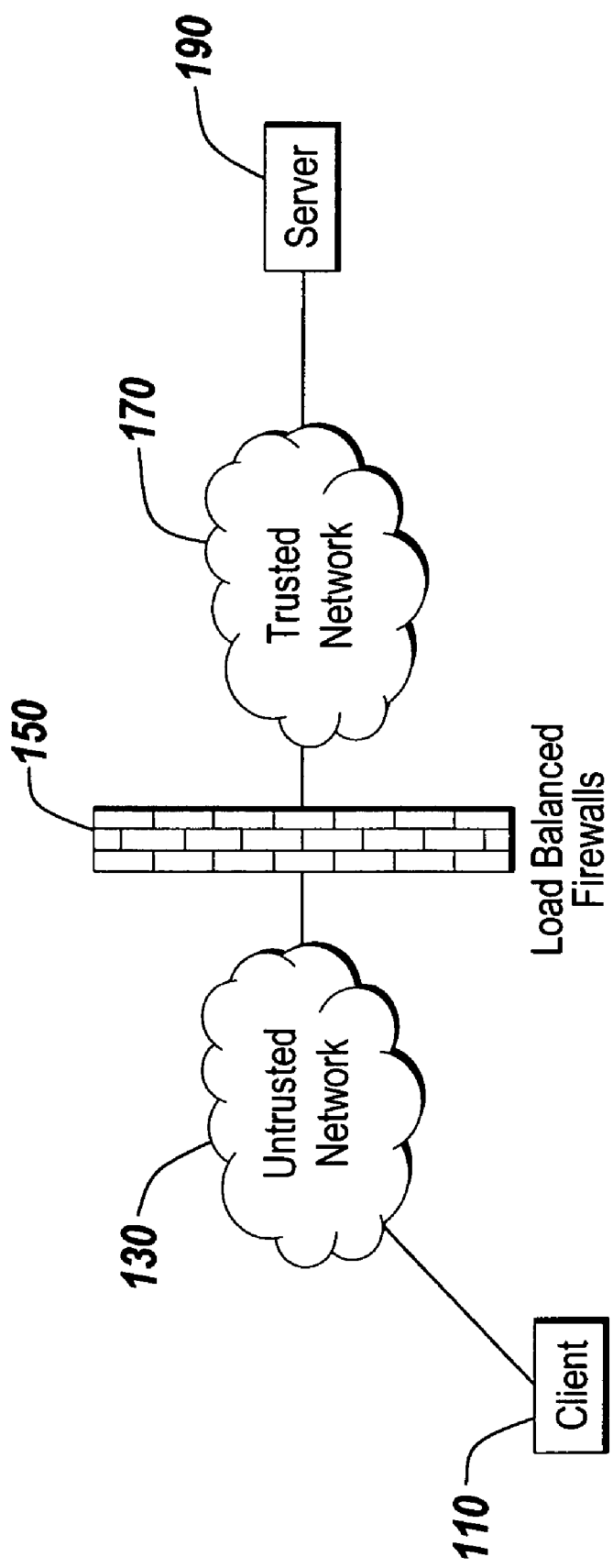
FIG. 1 depicts an example of load balanced firewalls in accordance with the illustrative embodiment of the present invention.

FIG. 1 depicts load balanced firewalls 150 provided in the illustrative embodiment of the present invention. The load balanced firewalls 150 are deployed between a trusted, protected network 170 and an untrusted network 130. For example, the trusted network 170 may include a corporate network, a home network, etc. The untrusted network may include the Internet, Public Switched Telephone Networks (PSTN), Public Switched Data Networks (PSDN), and any private networks deemed untrusted. The firewalls 150 limit network access between the untrusted network 130 and the trusted network 170. The firewalls 150 may allow anyone on the trusted network 170 to access the untrusted network 130, but stop unauthorized parties on the untrusted network 130 from gaining access to the trusted network 170.

Although the load balanced firewalls 150 are installed between a trusted network 170 and an untrusted network 130 in the illustrative embodiment of the present invention, one of skill in the art will appreciate that the firewalls 150 may be installed between any kinds of networks, such as between private networks. In addition, although the balanced firewalls 150 are depicted between the untrusted network 130 and the trusted network 170, one of skill in the art will also appreciate that the firewalls 150 are generally installed within the trusted network 170 and control traffic to and from the trusted network 170.

For illustrative purposes, a single client 110 and a single server 190 are coupled to the untrusted network 130 and the trusted network 170, respectively, to describe the illustrative embodiment of the present invention relative to traffic between the client 110 and the server 190. One of skill in the art will appreciate that a plurality of clients and servers (not shown) may be coupled to the untrusted network 130. One of skill in the art will also appreciate that a plurality of servers and clients (not shown) may be coupled to the trusted network 170. The present invention therefore may apply to traffic between a server on the untrusted network 130 and a client on the trusted network 190.

If the client 110 requests a service from the server 190, the service request from the client 110 passes through one of the firewalls 150. The firewalls 150 may grant or revoke access based on the client's authentication, source and destination network addresses, network protocol, time of day, network service, previous client activity or any combination of these. One of skill in the art will appreciate that other authentication mechanism and/or parameters may be used or defined to gain access through the firewalls 150. The firewalls 150 may be implemented as application level firewalls or packet level firewalls. The firewalls may also be implemented as a content filter, such as a virus wall. The server 190 may provide a service in response to the request of the client 190, which may also pass through one of the firewalls 150 and be provided to the client 110.

Figure 2:
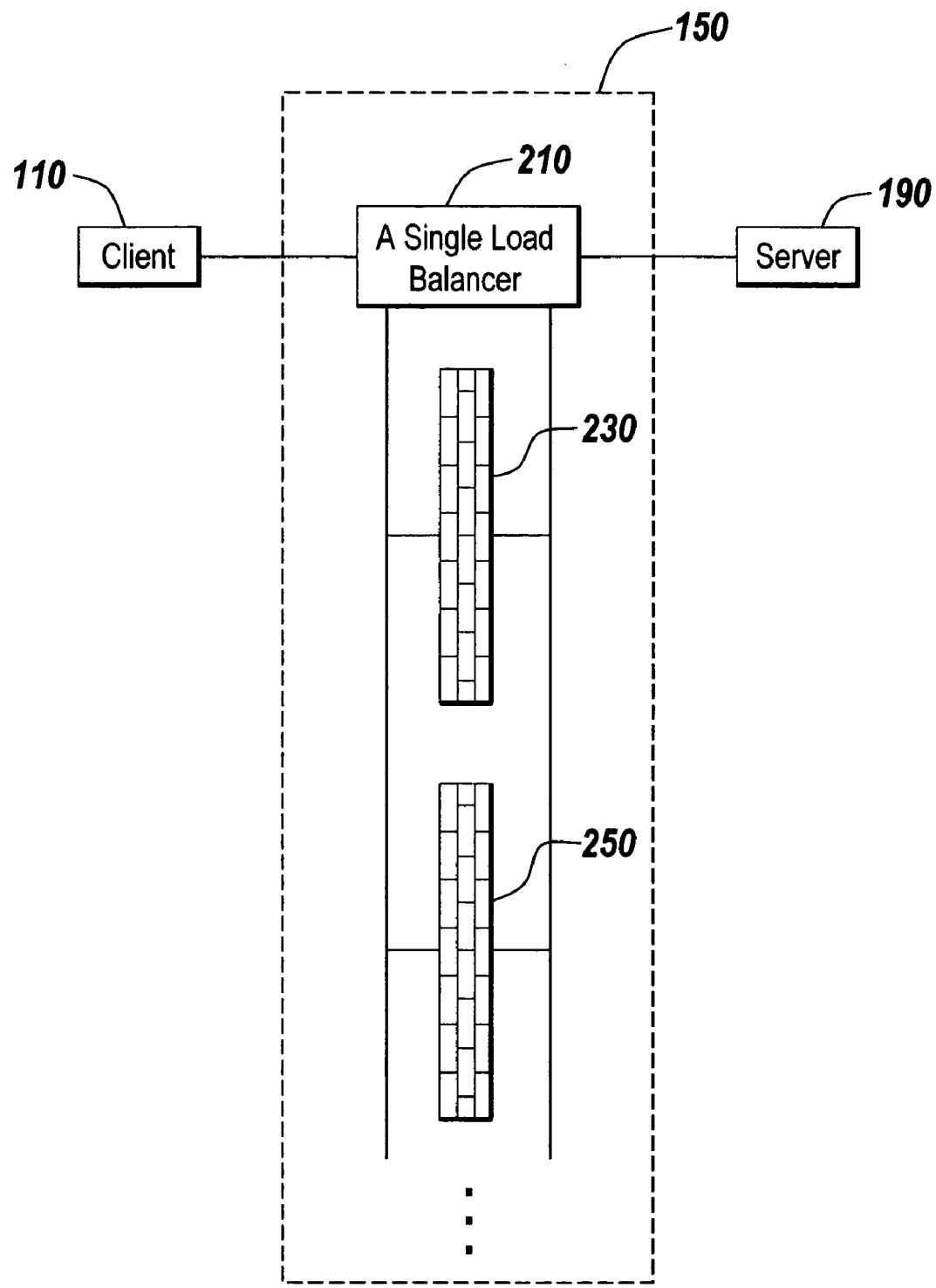
FIG. 2 depicts an exemplary load balancer for the load balanced firewalls depicted in FIG. 1.

FIG. 2 depicts an exemplary load balancer 210 of the firewalls 230 and 250 for the load balanced firewalls 150 depicted in FIG. 1. The load balanced firewalls 150 include a load balancer 210 and multiple firewalls 230 and 250. The load balancer 210 is an external to the firewalls 230 and 250 that controls bidirectional traffic to the multiple firewalls 230 and 250 to load balance the multiple firewalls 230 and 250. Although only two firewalls 230 and 250 are depicted in the illustrative embodiment, one of skill in the art will appreciate that more than two firewalls may be employed depending on the traffic volume to and from the trusted network 170.

The load balancer 210 is implemented in a single physical device, such as a switch. In other embodiments, the load balancer 210 may be a server or other components that can appropriately direct traffic. The load balancer 210 of the firewalls 230 and 250 is located between the client 110 and the server 190 to receive traffic from the client 110 and the server 190. The load balancer 210 of the firewalls 230 and 250 is coupled with the firewalls 230 and 250 in parallel to distribute the traffic to one of the firewalls 230 and 250. If the client 110 requests a service from the server 190, the request traffic flows from the client 110 to the load balancer 210, which in turn distributes the traffic to one of the firewalls 230 and 250 using a load balancing algorithm. The traffic passing through one of the firewalls 230 and 250 may be forwarded to the server 190 by the load balancer 210. The load balancer 210 remembers the properties the request traffic and the firewall that processed the request traffic. If the server 190 provides a service in response to the request of the client 110, the service traffic flows from the server 190 to the load balancer 210, which in turn distributes the traffic to the same firewall that processed the request traffic. In this way, the response to the request may be forced to flow through the same firewall as the request did. Likewise, the traffic initiated from within the trusted network 170 will be load balanced and forwarded to one of the firewalls 230 and 250 using a load balancing algorithm. The traffic passing through one of the firewalls 230 and 250 may be forwarded to a server in the untrusted network 130. If the server in the untrusted network 130 provides a service in response to the request, the service traffic flows to the load balancer 210 and is distributed to the same firewall that processed the traffic initiated from within the trusted network 170. The load balancing algorithm used to distribute incoming traffic may or may not be the same as the algorithm used to distribute the outgoing traffic.

The load balancing algorithm may include weighted hash, weighted random, round robin, source address, etc. The weighted hash algorithm attempts to distribute traffic proportionally according to weights across the firewalls 230 and 250. The weighted hash algorithm uses the load balancing weight setting associated with each firewall to see where it can distribute more or less traffic. The weighted random algorithm distributes traffic to the firewalls 230 and 250 randomly using weight settings. Firewalls with high weight therefore will be expected to receive more traffic than those configured with lower weight during the random selection. The round robin algorithm distributes traffic sequentially to the next firewall in a predefined repeating sequence. All the firewalls are treated equally, regardless of the number of connections. The source address algorithm directs traffic to the specific firewalls based on the source IP address of the traffic, typically using a hash of the source IP address.

One of skill in the art will appreciate that the load balancing algorithms described above are illustrative and the present invention may employ any other load balancing algorithms, such as a least connection algorithm that dynamically directs traffic to the firewall with the least number of active connections.

Figure 3:
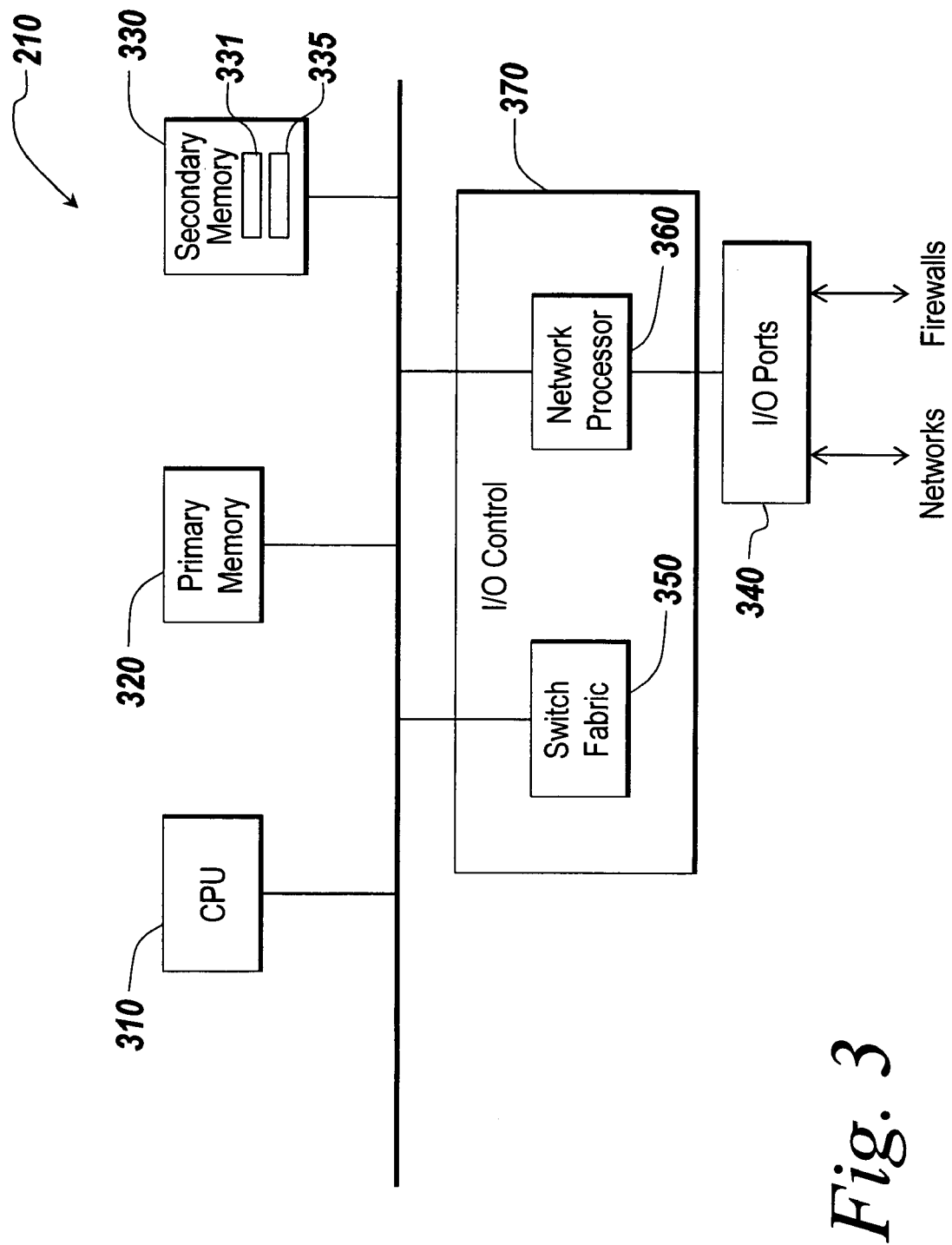
FIG. 3 depicts an exemplary structure of the load balancer suitable for practicing the illustrative embodiment of the present invention.

FIG. 3 depicts an exemplary structure of the load balancer 210 suitable for practicing the present invention. One of ordinary skill in the art will appreciate that the structure of the load balancer 210 is intended to be illustrative and not limiting the scope of the present invention. The load balancer 210 may be implemented in the form of a switch, such as N2000 Series from Nauticus Networks, Inc. One of skill in the art will appreciate that the load balancer 210 may take any other forms of electronic device, such as a workstation, a server, a computer, and the like.

The load balancer 210 includes a main processor 310, a primary memory 320, a secondary memory 330, I/O ports 340, a switch fabric 350 and a network processor 360. The main processor 310 controls each component of the load balancer 210 to distribute traffic to the firewalls 230 and. 250 properly using a load balancing algorithm. The main processor 310 may be implemented as a process running on a general purpose processor, such as an off-the-shelf PowerPC from IBM Corporation, which can also run a number of other processes that assist in the operation of the chip. The main processor 310 may communicate with other parts of the load balancer 210 via the well known PCI bus interface standard. The primary memory 320 fetches from the secondary memory 330 and provides to the main processor 310 the code that needs to be accessed by the main processor 310 to load balance the firewalls 230 and 250. The secondary memory 330 contains an operating system of the load balancer 210 and other software tools for load balancing the firewalls 230 and 250. The secondary memory 330 includes, in particular, code 331 and 335 for virtual routers, which will be described below in more detail with reference to FIGS. 4A and 4B. The load balancer 210 may receive and forward traffic through the I/O ports 340. The I/O ports 340 may include 100/10 Ethernet ports and/or 1 G Ethernet ports. The load balancer 210 may distribute traffic using the switch fabric 350 and the network processor 360 operatively connected between the I/O ports 340 and the switch fabric 350. The network processor 360 is designed to process network traffic at high data rate. The network processor 360 may be a commercially available network processor, such as IBM's Rainer network processor (e.g., NP4GS3).

Figure 4A:
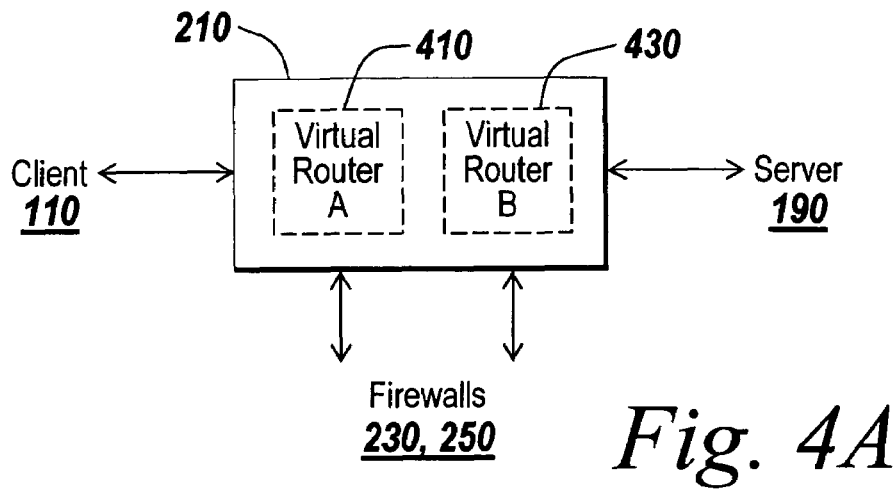
FIG. 4A is an exemplary load balancer that includes virtual routers for use in the illustrative embodiment of the present invention.

FIG. 4A is an exemplary load balancer 210 of the firewalls 230 and 250 that includes virtual routers 410 and 430 in the illustrative embodiment of the present invention. The load balancer 210, which is a single external device to the firewalls 230 and 250, includes virtual routers 410 and 430 for controlling incoming traffic from the client 110 to the server 190 and outgoing traffic from the server 190 to the client 110. The virtual routers 410 and 430 are independent of each other so that data routed by a virtual router 410 is separate from the data routed by the other router 430. The virtual routers 410 and 430 may be implemented using Virtual Switching Technology from Sun Microsystems, Inc.

The virtual routers 410 and 430 are logical domains in the load balancer 210 that share the physical resources of the load balancer 210 depicted in FIG. 3 The virtual routers 410 and 430 provide interfaces to the client 110, the server 190 and the firewalls 230 and 250. The virtual routers may support IP routing protocols running on the load balancer 210. For system management, the load balancer 210 may include an additional virtual router (not shown) that may use a configured Ethernet port for dedicated local or remote system management traffic where it isolates management traffic from data traffic on the load balancer 210.

Figure 4B:
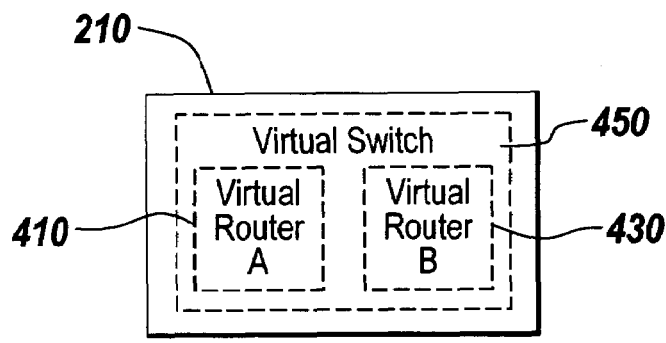
FIG. 4B depicts an exemplary load balancer that includes virtual routers incorporated in a virtual switch in the illustrative embodiment of the present invention.
Figure 4C:
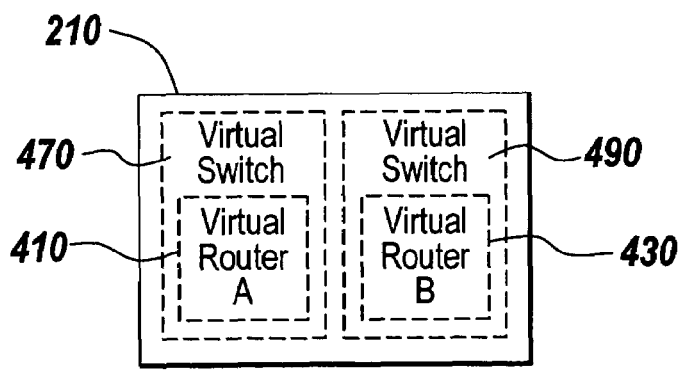
FIG. 4C depicts an exemplary load balancer that includes virtual routers incorporated in separate virtual switches in the illustrative embodiment of the present invention.

It should be appreciated that the present invention may be practiced with virtual routers 410 and 430 that are not encapsulated within virtual switches. Moreover, the virtual routers 410 and 430 that are used in load balancing may be incorporated in a single virtual switch 450, as depicted in FIG. 4B, or in separate virtual switches 470 and 490, as depicted in FIG. 4C, in some embodiments.

Figure 4D:
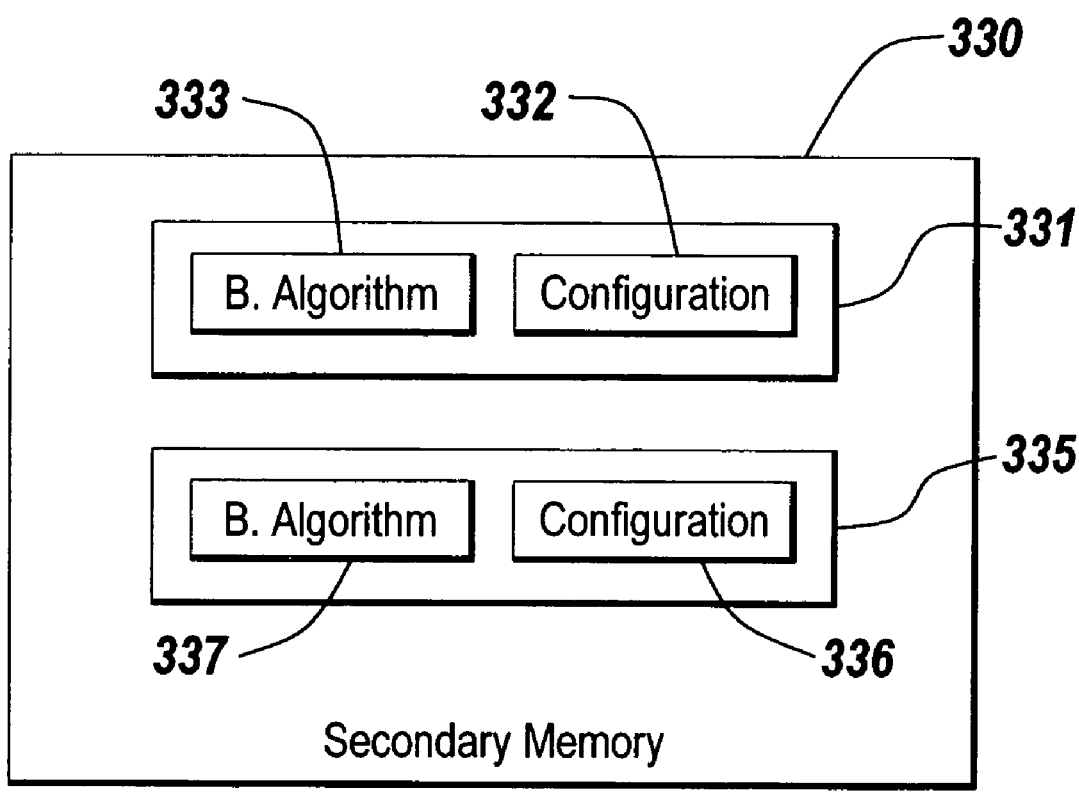
FIG. 4D depicts code for the virtual routers in the secondary memory of the load balancer depicted in FIG. 3.

FIG. 4D depicts code 331 and 335 for the virtual routers 410 and 430 in the secondary memory 330 of the load balancer 210 depicted in FIG. 3. The virtual routers 410 and 430 may include their own configurations 332 and 336 that can be configured by users. Each of the virtual routers 410 and 430 may be configured to provide a proper interface to the client 110, the firewalls 230 and 250 and/or the server 190. The configuration of the virtual routers 410 and 430 will be described in more detail with reference to FIGS. 5A-6B. The virtual routers 410 and 430 may also include their own load balancing algorithms 333 and 337 selected by users. The users may select the load balancing algorithms 333 and 337 among the load balancing algorithms described above with reference to FIG. 2 for the virtual routers 410 and 430 in the load balancer 210. The load balancing algorithms 333 and 337 selected for the virtual routers 410 and 430 may or may not be the same load balancing algorithm.

Figure 5A:
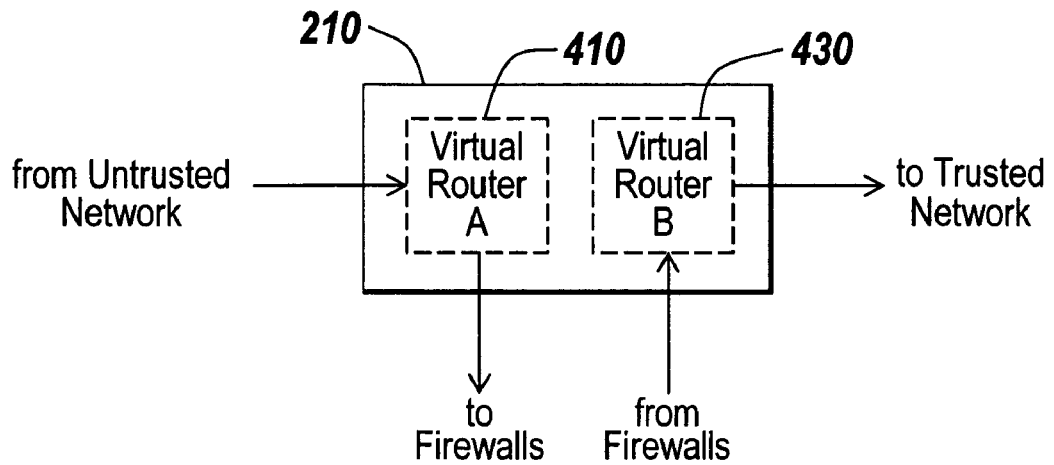
FIGS. 5A and 5B depict an exemplary configuration of the virtual routers in the load balancer depicted in FIG. 4A.
Figure 5B:
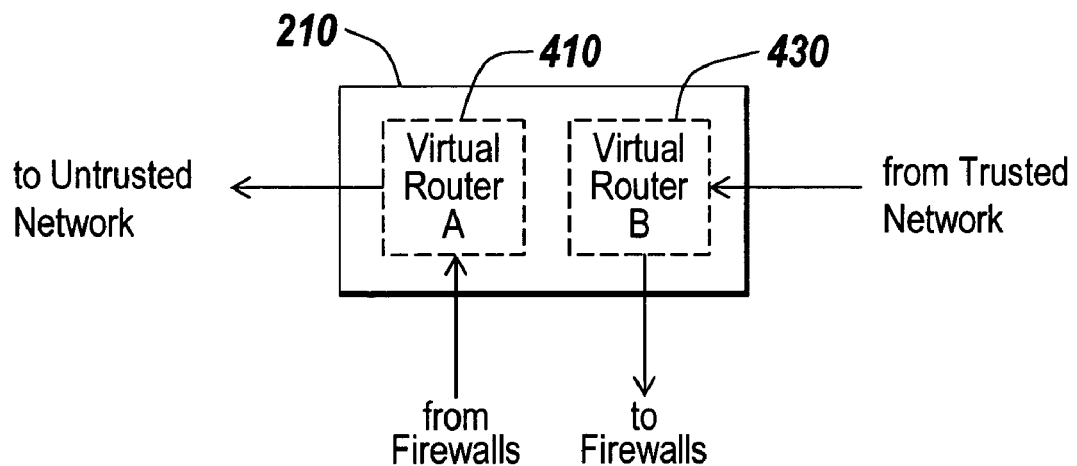

FIGS. 5A and 5B depict an exemplary configuration of the virtual routers 410 and 430 in the load balancer 210. The traffic flows between the client 110 and the server 190 through the virtual routers 410 and 430 and the firewalls 230 and 250. In the illustrative embodiment, the virtual router 410 is configured to provide an interface between the client 110 and the firewalls 230 and 250. The virtual router 430 is also configured to provide an interface between the server 190 and the firewalls 230 and 250. The virtual routers 410 and 430 may be configured with proper physical. Ethernet ports 340, Link Aggregation Groups (LAGs), Virtual LANs (VLANs), or other IP interfaces coupled to the client 110, the firewall 230 and 250, and/or the server 190. The virtual routers 410 and 430 may be configured with different LAGs or VLANs, such as VLAN1 and VLAN2, to interface with the firewalls 230 and 250. The LAGs and VLANs may be configured over the Ethernet interfaces. The traffic received by the load balancer 210 may be associated with the virtual routers 410 and 430 based on the information about the Ethernet interface, VLAN identification, Multi-Protocol Label Switching (MPLS) tags, and other IP address information of the traffic.

If the load balancer 210 receives traffic from the client 110 (see FIG. 5A), the virtual router 410 will be given the control of the traffic based on the identification of the IP interface through which the traffic is received. The virtual router 410 routes the traffic to one of the firewalls 230 and 250 using the physical resources of the load balancer 210, such as the network processor 260 and the switch fabric 250 that are needed to route the traffic, based on the balancing algorithm 333. The traffic that passes through one of the firewalls 230 and 250 is received by the load balancer 210. The virtual router 430 takes control of the configured ports 340 and forwards the traffic to the server 190.

If the load balancer 210 receives traffic from the server 190 (see FIG. 5B), the virtual router 430 will be given the control of the traffic based on the identification of the IP interface through which the traffic is received. The virtual router 430 routes the traffic using the physical resources of the load balancer 210, such as the network processor 260 and the switch fabric 250 that are needed to route the traffic, based on its balancing algorithm 337. The traffic that passes through one of the firewalls 230 and 250 is received by the load balancer 210. The virtual router 410 takes control of the configured ports 340 and forwards the traffic to the client 110.

Figure 6A:
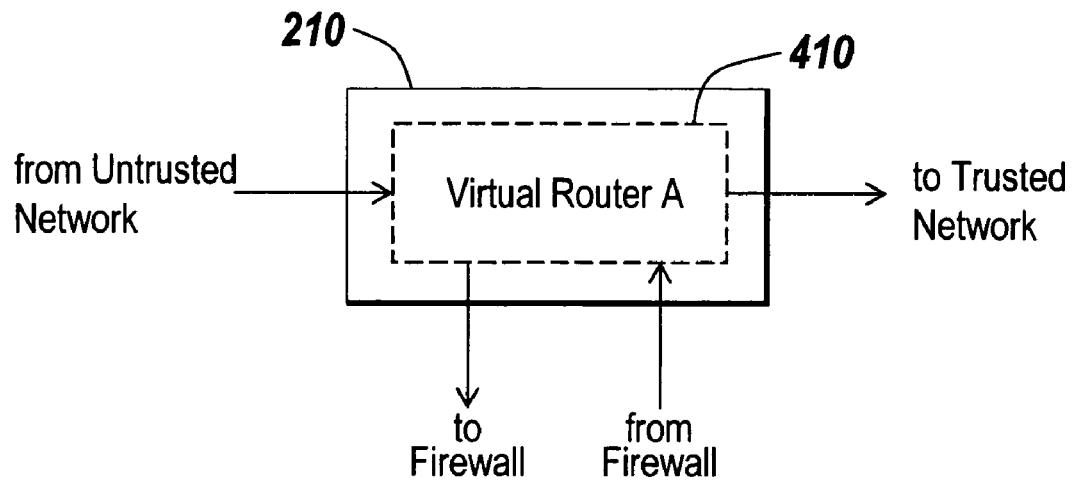
FIGS. 6A and 6B depict another exemplary configuration of the virtual routers in the load balancer depicted in FIG. 4A.
Figure 6B:
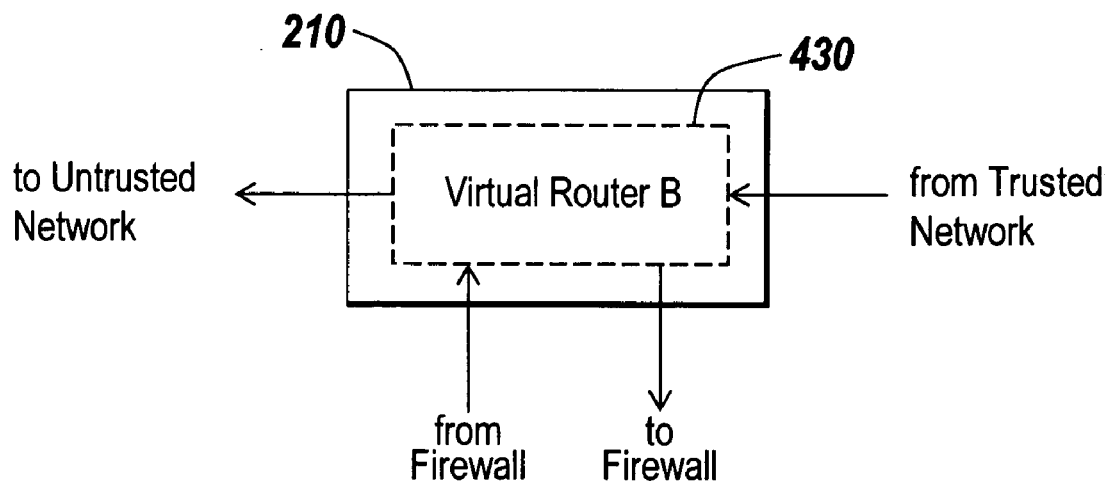

FIGS. 6A and 6B depict another exemplary configuration of the virtual routers 410 and 430 in the load balancer 210. In the illustrative embodiment, the virtual router 410 is configured to provide both an interface between the client 110 and the firewalls 230 and 250 and an interface between the server 190 and the firewalls 230 and 250 for bidirectional traffic between the client 110 and the server 190. The load balancer 210 receives traffic from the client 110 through the configured I/O ports 340. The virtual router 410 takes the control of the configured ports through which the traffic is received. The virtual router 410 routes the traffic to one of the firewalls 230 and 250 using physical resources, such as the network processor 260 and the switch fabric 250, based on the load balancing algorithm 333. The traffic that passes through one of the firewalls 230 and 250 is received by the load balancer 210 and forwarded to the server 190 by the virtual router 410.

Likewise, the virtual router 430 is configured to provide both an interface between the client 110 and the firewalls 230 and 250 and an interface between the server 190 and the firewalls 230 and 250 for traffic from the server 190 to the client 110. The load balancer 210 receives traffic from the server 190 using one or more ports 340. The virtual router 430 takes the control of the configured ports 340, through which the traffic is received. The virtual router 430 routes the traffic to one of the firewalls 230 and 250 using the physical resources of the load balancer 210, such as the network processor 260 and the switch fabric 250, based on the load balancing algorithm 337. The traffic that passes through one of the firewalls 230 and 250 is received by the load balancer 210 and forwarded to the client 110 by the virtual router 430.

In summary, the illustrative embodiment of the present invention provides a single device for load balancing firewalls. The device is provided with virtual routers for routing incoming and outgoing traffic to the firewalls. The virtual routers are logical partitions of the device that share physical resources of the device. The virtual routers operate independently of each other so that data routed by a virtual router is routed independently from the data routed by the other router, using separate routing tables, protocols, and IP interfaces. The virtual routers may include their own configurations to provide interfaces to the firewalls and to networks. The virtual routers may include their own load balancing algorithms and also a mechanism to learn the association of the traffic with firewalls. The single device for load balancing firewalls enables users to efficiently configure and manage the load balancing of the firewalls. The single device for load balancing firewalls also reduces cost of load balancing firewalls.

It will thus be seen that the invention attains the objectives stated in the previous description. Since geometric changes may be made without departing from the scope of the present invention, it is intended that all matter contained in the above description or shown in the accompanying drawings be interpreted as illustrative and not in a literal sense. For example, the illustrative embodiment of the present invention may be practiced with any servers that process bidirectional traffic in networks. Practitioners of the art will realize that the sequence of steps and architectures depicted in the figures may be altered without departing from the scope of the present invention and that the illustrations contained herein are singular examples of a multitude of possible depictions of the present invention.

We claim:

1. An apparatus comprising:
    a load balancer, wherein the load balancer load balances traffic in a network environment and includes:
        a first virtual router for routing and load balancing the traffic to and from an untrusted network; and
        a second virtual router for routing and load balancing the traffic to and from a trusted network;
    wherein the first virtual router and the second virtual router are logical partitions of the load balancer and share physical resources of the load balancer, and wherein the first virtual router and the second virtual router operate independently of each other, such that data routed by the first virtual router is separate from data routed by the second virtual router.

2. The apparatus of claim 1, wherein the load balancer load balances bi-directional traffic across a plurality of entities in the network environment.

3. The apparatus of claim 1, wherein the load balancer includes a virtual switch, the virtual switch comprising the first virtual router and the second virtual router.

4. The apparatus of claim 1 comprising:
    a plurality of firewalls in the network environment, wherein the load balancer includes switching capabilities for directing traffic to the plurality of firewalls;
    wherein the first virtual router comprises:
        a first virtual router for load balancing the plurality of firewalls for traffic from an untrusted network to the plurality of firewalls;
    and wherein the second virtual router comprises:
        a second virtual router for load balancing the plurality of firewalls for traffic from a trusted network to the plurality of firewalls.

5. The apparatus of claim 4, wherein the first virtual router is implemented in a first virtual switch.

6. The apparatus of claim 5, wherein the second virtual router is implemented in the first virtual switch.

7. The apparatus of claim 5, wherein the second virtual router is implemented in a second virtual switch.

8. The apparatus of claim 1 wherein the first virtual router and the second virtual router operate independently of each other, such that the first virtual router and the second virtual router have separate routing tables, separate protocols, and separate network addresses.

9. A method comprising:
    providing a single physical device for load balancing traffic in a network environment by:
        providing a first virtual router within the single physical device, the first virtual router capable of routing and load balancing the traffic to and from an untrusted network; and
        providing a second virtual router within the single physical device, the second virtual router capable of routing and load balancing the traffic to and from a trusted network;
    wherein the first virtual router and the second virtual router are logical partitions of the single physical device and share physical resources of the single physical device, and wherein the first virtual router and the second virtual router operate independently of each other, such that data routed by the first virtual router is separate from data routed by the second virtual router; and load balancing traffic in the network environment using the single physical device.

10. The method of claim 9, wherein load balancing comprises:

load balancing bi-directional traffic across a plurality of entities in the network environment using the single physical device.

11. The method of claim 9 comprising:

providing a virtual switch within the single physical device, the virtual switch comprising the first virtual router and the second virtual router.

12. The method of claim 9 comprising:

providing a plurality of firewalls in the network environment, wherein the single physical device includes switching capabilities for directing traffic to the plurality of firewalls;

wherein providing a first virtual router comprises:

providing a first virtual router within the single physical device, the first virtual router capable of load balancing the plurality of firewalls for traffic from an untrusted network to the plurality of firewalls;

and wherein providing a second virtual router comprises:

providing a second virtual router within the single physical device, the second virtual router capable of load balancing the plurality of firewalls for traffic from a trusted network to the plurality of firewalls.

13. The method of claim 12, wherein providing a first virtual router comprises:

providing a first virtual router within the single physical device, the first virtual router capable of load balancing the plurality of firewalls for traffic from an untrusted network to the plurality of firewalls, wherein the first virtual router is implemented in a first virtual switch.

14. The method of claim 13, wherein providing a second virtual router comprises:

providing a second virtual router within the single physical device, the second virtual router capable of load balancing the plurality of firewalls for traffic from a trusted network to the plurality of firewalls, wherein the second virtual router is implemented in the first virtual switch.

15. The method of claim 13, wherein providing a second virtual router comprises:

providing a second virtual router within the single physical device, the second virtual router capable of load balancing the plurality of firewalls for traffic from a trusted network to the plurality of firewalls, wherein the second virtual router is implemented in a second virtual switch.

16. The method of claim 9 wherein the first virtual router and the second virtual router operate independently of each other, such that the first virtual router and the second virtual router have separate routing tables, separate protocols, and separate network addresses.

17. A single physical device comprising:

a memory;

a processor;

wherein the memory includes instructions that when executed on the processor results in the single physical device load balancing traffic in a network environment by performing operations of:

providing a single physical device for load balancing traffic in a network environment by:

providing a first virtual router within the single physical device, the first virtual router capable of routing and load balancing the traffic to and from an untrusted network; and providing a second virtual router within the single physical device, the second virtual router capable of routing and load balancing the traffic to and from a trusted network;

load balancing traffic in the network environment using the single physical device; and wherein the first virtual router and the second virtual router are logical partitions of the single physical device and share physical resources of the single physical device, and wherein the first virtual router and the second virtual router operate independently of each other, such that data routed by the first virtual router is separate from data routed by the second virtual router.

18. The single physical device of claim 17, wherein load balancing comprises:

load balancing bi-directional traffic across a plurality of entities in the network environment using the single physical device.

19. The single physical device of claim 17 providing a virtual switch within the single physical device, the virtual switch comprising the first virtual router and the second virtual router.

20. The single physical device of claim 17 providing a plurality of firewalls in the network environment, wherein the single physical device includes switching capabilities for directing traffic to the plurality of firewalls;

wherein computer program code for providing a first virtual router comprises:

providing a first virtual router within the single physical device, the first virtual router capable of load balancing the plurality of firewalls for traffic from an untrusted network to the plurality of firewalls;

and wherein computer program code for providing a second virtual router comprises:

providing a second virtual router within the single physical device, the second virtual router capable of load balancing the plurality of firewalls for traffic from a trusted network to the plurality of firewalls.

21. The single physical device of claim 20 wherein providing a first virtual router comprises:

providing a first virtual router within the single physical device, the first virtual router capable of load balancing the plurality of firewalls for traffic from an untrusted network to the plurality of firewalls, wherein the first virtual router is implemented in a first virtual switch.

22. The of single physical device of claim 21 wherein for providing a second virtual router comprises:

providing a second virtual router within the single physical device, the second virtual router capable of load balancing the plurality of firewalls for traffic from a trusted network to the plurality of firewalls, wherein the second virtual router is implemented in the first virtual switch.

23. The single physical device of claim 21 wherein providing the second virtual router comprises:

providing a second virtual router within the single physical device, the second virtual router capable of load balancing the plurality of firewalls for traffic from a trusted network to the plurality of firewalls, wherein the second virtual router is implemented in a second virtual switch.

24. The single physical device of claim 17 wherein the first virtual router and the second virtual router operate independently of each other, such that the first virtual router and the second virtual router have separate routing tables, separate protocols, and separate network addresses.

* * * * *